G. W. CAMERON.
INSECT DESTROYER.
APPLICATION FILED AUG. 13, 1917.
1,255,131.
Patented Feb. 5, 1918.
3 SHEETS—SHEET 1.
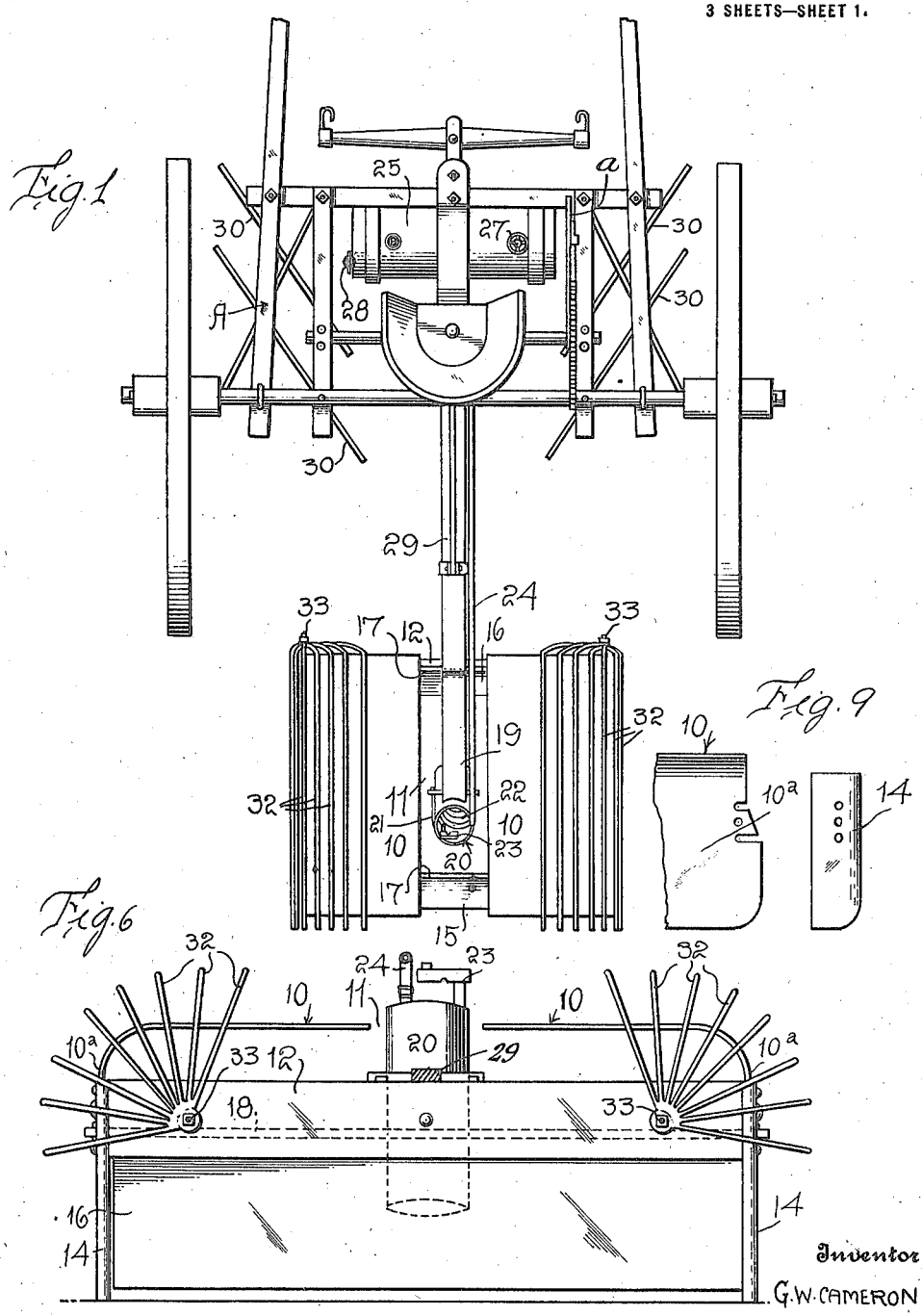
Inventor
G. W. CAMERON
By Watson E. Coleman
Attorney

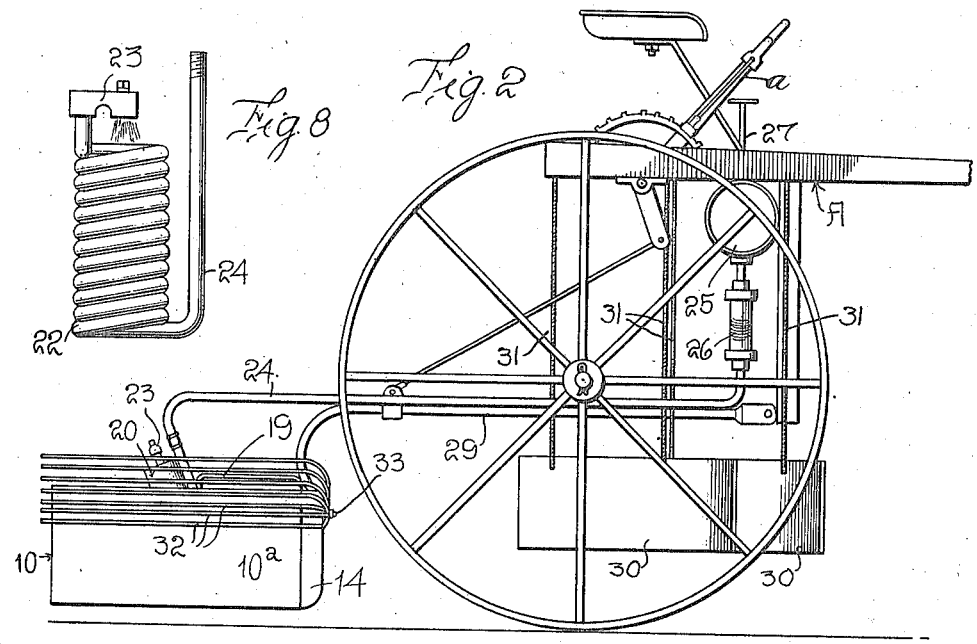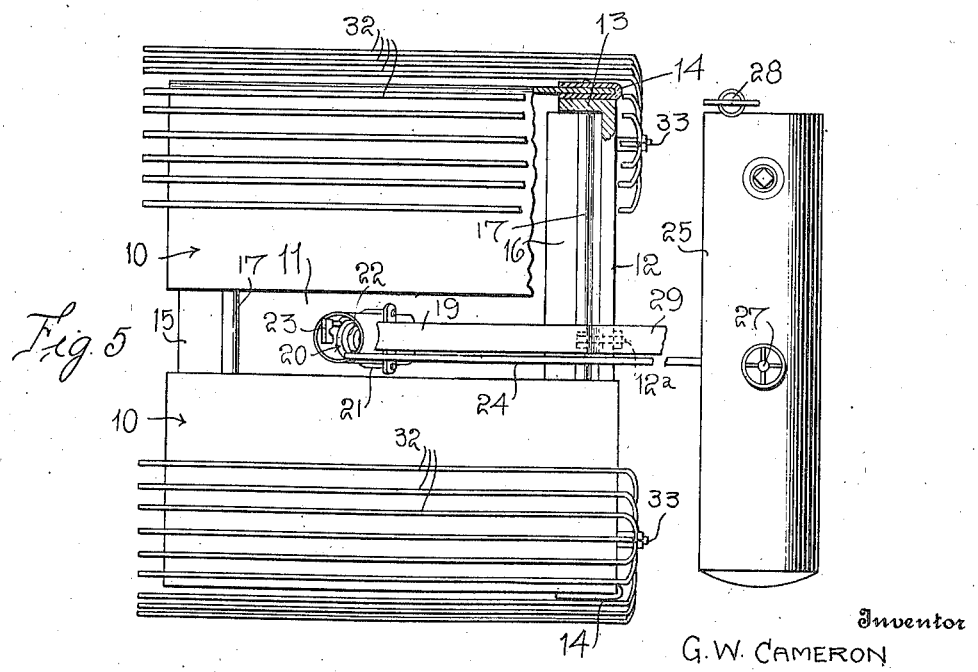

G. W. CAMERON.
INSECT DESTROYER.
APPLICATION FILED AUG. 13, 1917.
1,255,131.
Patented Feb. 5, 1918.
3 SHEETS—SHEET 3.
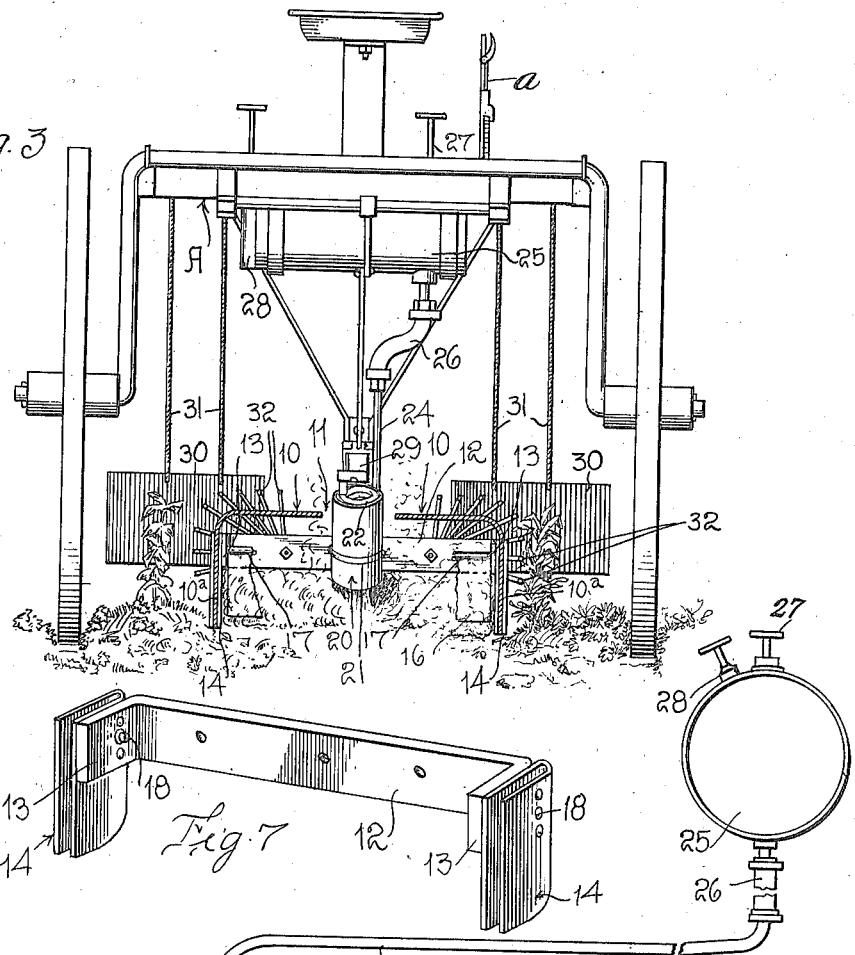
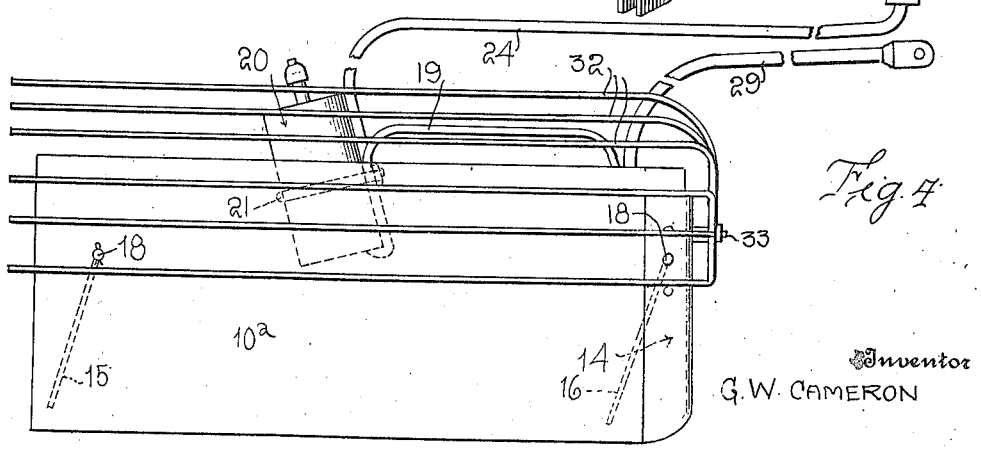
Inventor
G. W. CAMERON
By Watson E. Coleman
Attorney

UNITED STATES PATENT OFFICE.

GEORGE W. CAMERON, OF HONDO, TEXAS.

INSECT-DESTROYER.

1,255,131. Specification of Letters Patent. Patented Feb. 5, 1918.

Application filed August 13, 1917. Serial No. 186,006.

*To all whom it may concern:*

Be it known that I, GEORGE W. CAMERON, a citizen of the United States, residing at Hondo, in the county of Medina and State of Texas, have invented certain new and useful Improvements in Insect-Destroyers, of which the following is a specification, reference being had to the accompanying drawings.

This invention relates to insect destroyers, and particularly to means for destroying insects on such crops as cotton, potatoes and the like.

The general object of the invention is to provide an incinerator which is adapted to be drawn over the ground between the rows of plants and is in the form of an oven, open at the bottom, so that the ground forms the bottom wall of the oven, and so arranged that heat generated within the incinerator will be directed downward against the ground destroying the insects, which are knocked off the plants and into the path of the incinerator and also assisting in destroying weeds and other noxious growths.

A further object is to provide a construction of this character having guards to prevent the plants from coming in contact with the highly heated oven of the incinerator.

Still another object is to provide means whereby this incinerator may be connected to and mounted upon a cultivator frame and drawn thereby.

A further object is to provide an improved type of burner for the incinerator wherein the fuel is highly heated before the ignited fuel is discharged upon the ground.

A further object is to provide an incinerator of this character wherein the downwardly projected flame from the burner is directed against the earth and by the earth is deflected laterally so as to spread over the entire surface defined by the oven walls.

Other objects will appear in the course of the following description.

My invention is illustrated in the accompanying drawings, wherein:—

Figure 1 is a top plan view of a cultivator with my incinerator or insect destroyer connected thereto;

Fig. 2 is a side elevation of the cultivator and incinerator;

Fig. 3 is a rear view of the cultivator, the incinerator being shown in section and showing the action of the flame;

Fig. 4 is an enlarged side elevation of the incinerator showing the front and rear doors in dotted lines and showing the construction to the fuel tank;

Fig. 5 is a top plan view of the incinerator and fuel tank, the incinerator being partly broken away to show the mounting of the doors;

Fig. 6 is a front end elevation of the incinerator;

Fig. 7 is a perspective view of the board which supports the side walls and holds them in spaced relation; and Fig. 8 is a side elevation of the burner.

Fig. 9 is a fragmentary side elevation of the forward end of one hood section and the corresponding clip 14 separated.

Referring to these drawings, it will be seen that my improved incinerator comprises hood sections 10, which are spaced from each other and extend upward and then toward each other, the inner edges of the hoods being spaced from each other to leave a longitudinally extending slot 11, as shown most clearly in Fig. 5. The side walls $10^a$ are connected to each other at their front ends by a transverse bar 12 having angularly bent extremities 13. Attached to these angular extremities are strips of metal 14, which are folded upon themselves to provide two spaced side walls and the clips thus formed embrace the side walls $10^a$, as shown clearly in Fig. 5, the side walls being pivoted or otherwise hinged to these clips. The hood sections may be braced from each other in any other desired manner, and I do not wish to be limited to the construction illustrated.

Swingingly mounted between the side walls $10^a$, as illustrated in Fig. 4, are the front and rear walls 16 and 15. Each of these walls 15 and 16 at its upper edge is formed to provide a bead 17 engaging a transversely extending pintle 18, which is supported in the side walls and also passes through the clips 14, as illustrated most clearly in Fig. 5. As shown in dotted lines in Fig. 4, these forward and rear walls 16 and 15 are free to swing rearward to any desired extent, as the machine is drawn over the ground and act to prevent the heat from escaping from the ends of the oven.

Operatively supported upon a bar or bracket 19 is a vapor generator and burner 20, which is disposed through the slot 11, as shown in Fig. 5. The bar or bracket 19 is transversely flat and extends downward to the lower end of the generator and is attached thereto in any suitable manner, but is shown as attached thereto by means of a U-shaped clip bolt 21. This vapor generator comprises, as illustrated in Fig. 8, a closely coiled pipe 22, the inlet end of this pipe being connected to a source of fuel, the outlet end of the pipe extending upward and being engaged with a burner proper 23 comprising a rectangular casing or head having an opening discharging downward through the coil, this head 23 being spaced from the top of the coil a sufficient distance to permit proper admixture of air with the escaping vapor. The flame projected downward from this head 23 vaporizes the fuel within the coil 23 and the flame is discharged against the ground as illustrated clearly in Fig. 3.

The pipe 24, which connects with the coil, extends forward and then upward to a tank 25, which contains the fuel, there being a flexible section 26 between the pipe 24 and the fuel tank 25. The passage of fuel from the tank 25 into the pipe 24 is controlled by a needle valve 27 and the fuel is positively forced into the generator and burner by compressing air in the upper portion of the tank by means of the air pump 28. For the purpose of dragging the incinerator behind a cultivator, I provide a draw bar 29, which extends rearward and then downward and slightly forward, and is connected to the bar 12 in any suitable manner, as by a bolt 12ª and bracket 19 extends forward and is attached to the downwardly extending end of the draw bar 29, as illustrated most clearly in Fig. 4. The draw bar 29 may be in the form of a cultivator beam or may be one of the cultivator beams of the machine, and I have shown it as such. The cultivator A may be of any suitable or ordinary construction and I, of course, do not wish to limit myself to the particular form of cultivator or other wheeled frame which is used for the purpose of dragging the incinerator between the rows of plants.

For the purpose of knocking insects off of the plants and into the path of the incinerator, I provide means suspended upon the frame of the cultivator in advance of the incinerator, which will strike the plants and deflect them sharply and suddenly over toward the line of travel of the incinerator and for this purpose I have shown the swinging boards 30, there being two of these boards, as illustrated in Fig. 1, on each side of the machine, and these boards being inclined forward and outward so that when they strike the plants, the plants will be forced inward and throw the insects toward the middle plane of the machine. These boards or equivalent instrumentalities are preferably supported from the frame of the cultivator by means of wires, cords, or like devices, designated 31. As the boards are swingingly mounted, they will not injure the plants or strip the leaves therefrom as would chains or like devices.

In order to prevent the plants from striking the very highly heated walls of the incinerator, I provide a series of shield rods 32, which arch over the body of the incinerator, preferably at the outer upper corners thereof. These shield rods 32 are not supported at their rear ends, but at their forward ends they extend downward and each set of shield rods is supported upon a bolt 33 passing through the bar 12.

The operation of this incinerator will be clear from Fig. 3. The insects are knocked off into the path of movement of the incinerator. As the incinerator passes over them, they are subjected to the intense heat within the oven or incinerator and to the direct action of the flames which are discharged against the ground from the burner and deflected laterally. Inasmuch as the plants themselves cannot come in contact with the oven or incinerator, there can be no damage done to the plants, but all the ground between the rows will be submitted to the action of the heat and thus noxious weeds or other growths will be destroyed by the fire.

It is to be noted that the hood sections 10 are pivotally mounted upon the bolt 18 which constitutes the pintle for the forward wall 16 and thus these hood sections will ride over the ground and rise and fall with irregularities in the ground. The U-shaped clips 14 are rounded off at their lower front ends, thus allowing them to more easily drag over an obstruction and at the same time protect the front ends of the side walls 10ª as these side walls are made of light sheet metal and would become easily deformed by striking obstacles if it were not for the protection afforded by the U-shaped clips. These side walls of the hood sections, as well as the end walls, are made from about #18 gage sheet iron and no wood or other combustible material is used in the construction of the oven. The pivoted end walls 15 and 16 swing freely and drag along the surface of the ground, while the side walls of the hood sections are dragged along in a shallow furrow formed by the U-shaped clips. The oven or incinerator is made very flexible in its connections, so that it will adjust itself to uneven ground. The draw bar 29 is so connected to the cultivator frame that the rear end of the draw bar may rise and fall and the lever a on the cultivator frame A is connected by a rod or other suitable connection to the beam 29 so as to permit the oven to be raised when traveling to and from the place where it is to be used or when turning around at the end of a row. Any lever suitable for the purpose which may be found upon an ordinary cultivator may be used or the cultivator may be provided with a special lever for the purpose. The connections between the lever and the beam 29 will, of course, vary with the different makes of cultivators. It will be also noted that the beam 29 is connected to the cross bar 12, which is of relatively heavy material and that the bracket 19 is also connected to this cross bar and thus no strain comes upon the hood sections of the oven, permitting these sections to rise and fall freely and to conform to the surface of the ground over which they move.

The invention is very simple, has been found thoroughly effective in practice, and is much more destructive of insect life than merely knocking the insects into collecting pans from which they are liable to escape.

While I have illustrated a form of my invention which I have found in practice to be extremely effective, it will be obvious that the details of construction may be modified in many ways without departing from the spirit of the invention and that the device may be made and arranged to suit various forms of cultivators or that it may be drawn over the ground by other means than by attaching to a cultivator.

Having thus described my invention, what I claim is:—

1. An insect destroyer comprising a hood composed of oppositely disposed upwardly and inwardly arching hood sections, said hood constituting an incinerator, draft devices applied to said sections, and a burner projecting downwardly within said hood.

2. An insect destroyer comprising an incinerator formed of two laterally disposed hood sections, a cross bar connecting said hood sections and to which draft devices are attached, and a downwardly directed burner mounted upon said cross bar.

3. An insect destroyer comprising an incinerator having side walls and open at its bottom, a burner disposed within the incinerator and directed downward, and means disposed in advance of the incinerator and on each side thereof for bending the plants over into the path of the incinerator and releasing said plants before the incinerator arrives at the plants.

4. An insect destroyer including a cross bar to which draft devices are attached, hood sections each having a side wall and a top wall, the hood sections being pivotally connected to the cross bar for vertical movement, and a downwardly directed burner disposed within the incinerator.

5. An insect destroyer comprising an oven having side and top walls, draft devices attached to the oven, a downwardly directed burner disposed within the oven, and plant guards attached to the forward end of the oven and extending rearwardly thereover in spaced relation to the sides and top of the oven.

6. An insect destroyer including a cross bar to which draft devices are adapted to be attached, vertically disposed U-shaped clips mounted upon the cross bar, hood sections, each having a side wall and a top wall, the top walls being directed toward each other, the forward ends of the side walls being engaged in said clips, and a downwardly directed burner disposed between said top walls.

7. An insect destroyer including a cross bar to which draft devices are adapted to be attached, vertically disposed U-shaped clips mounted upon the cross bar, hood sections, each having a side wall and a top wall, the top walls being directed toward each other, the forward ends of the side walls being engaged in said clips, and a downwardly directed burner disposed between said top walls, the side walls of the hood sections being detachably engaged with the clips.

8. An insect destroyer including a cross bar to which draft devices are adapted to be attached, vertically disposed U-shaped clips mounted upon the cross bar, hood sections, each having a side wall and a top wall, the top walls being directed toward each other, the forward ends of the side walls being engaged in said clips, and a downwardly directed burner disposed between said top walls, the side walls being detachably and pivotally engaged with said clips for vertical movement.

9. An insect destroyer comprising an incinerator having a front cross bar to which draft devices are adapted to be attached, laterally disposed hood sections connected to said cross bar at their forward ends, each hood section having a side wall and an inwardly directed top wall, a plurality of guard rods extending longitudinally over the top and side walls of each section and meeting at a common point, bolts holding said guards to the cross bar at said common point, and a downwardly directed burner mounted between the top walls of the hood section.

10. The combination with a wheeled frame, of a draw bar attached to the frame for vertical pivotal movement, an incinerator mounted upon the draw bar and traveling behind the frame, said incinerator being open at its bottom and having a downwardly directed burner therein, means mounted upon the frame for raising or lowering the draw bar, a fuel tank mounted upon the frame and operatively connected to the burner, and plant shaking devices mounted upon the frame forward of the incinerator.

11. The combination with a wheeled frame, of a draw bar attached to the frame for vertical pivotal movement, an incinerator mounted upon the draw bar and traveling behind the frame, said incinerator being open at its bottom and having a downwardly directed burner therein, means mounted upon the frame for raising or lowering the draw bar, a fuel tank mounted upon the frame and operatively connected to the burner, and plant shaking devices mounted upon the frame forward of the incinerator and comprising a plurality of laterally and forwardly inclined members suspended flexibly from the frame, the rear ends of said members being spaced from the incinerator.

In testimony whereof I hereunto affix my signature in the presence of two witnesses.

GEORGE W. CAMERON.

Witnesses:
GEO. MUENNINK,
W. G. MUENNINK.